US008558795B2

(12) United States Patent
Hoerl

(10) Patent No.: US 8,558,795 B2
(45) Date of Patent: Oct. 15, 2013

(54) SWITCHLESS KVM NETWORK WITH WIRELESS TECHNOLOGY

(75) Inventor: David Hoerl, Warren, NJ (US)

(73) Assignee: RIIP, Inc., Warren, NJ (US)

( * ) Notice: Subject to any disclaimer, the term of this patent is extended or adjusted under 35 U.S.C. 154(b) by 1864 days.

(21) Appl. No.: 10/799,349

(22) Filed: Mar. 12, 2004

(65) Prior Publication Data

US 2005/0204026 A1    Sep. 15, 2005

(51) Int. Cl.
*G09G 5/00*    (2006.01)

(52) U.S. Cl.
USPC ............. 345/168; 345/1.1; 345/2.3; 345/204; 709/203; 709/223

(58) Field of Classification Search
USPC ............ 345/1.1, 2.1, 2.3, 157, 163, 168, 204; 709/202, 203, 208–211, 217–219, 709/223–226, 227, 229, 246; 348/14.02, 348/14.05, 14.11
See application file for complete search history.

(56) References Cited

U.S. PATENT DOCUMENTS

| | | | |
|---|---|---|---|
| 4,698,672 A | 10/1987 | Chen et al. | |
| 4,771,865 A | 9/1988 | Hinderling | |
| 5,008,747 A | 4/1991 | Carr et al. | |
| 5,483,634 A | 1/1996 | Hasegawa | |
| 5,552,832 A | 9/1996 | Astle | |
| 5,576,845 A | 11/1996 | Komatsu | |
| 5,721,842 A | 2/1998 | Beasley | |
| 5,732,212 A | 3/1998 | Perholtz | |
| 5,742,274 A | 4/1998 | Henry et al. | |
| 5,757,424 A | 5/1998 | Frederick | |
| 5,767,897 A | 6/1998 | Howell | |
| 5,802,213 A | 9/1998 | Gardos | |
| 5,821,986 A | 10/1998 | Yuan et al. | |
| 5,861,960 A * | 1/1999 | Suzuki et al. | ................. 382/239 |
| 5,884,096 A | 3/1999 | Beasley | |
| 5,937,176 A | 8/1999 | Beasley | |
| 6,016,166 A | 1/2000 | Huang et al. | |
| 6,091,857 A | 7/2000 | Shaw et al. | |
| 6,112,264 A | 8/2000 | Beasley | |
| 6,167,432 A | 12/2000 | Jiang | |
| 6,173,082 B1 | 1/2001 | Ishida et al. | |
| 6,252,884 B1 | 6/2001 | Hunter | |
| 6,263,365 B1 | 7/2001 | Scherpbier | |
| 6,289,378 B1 | 9/2001 | Meyer et al. | |

(Continued)

OTHER PUBLICATIONS

The International Search Report and Written Opinion by the International Searching Authority, issued on Sep. 19, 2007, in the PCT application No. PCT/US06/38567, which corresponds to U.S. Appl. No. 11/241,845.

(Continued)

*Primary Examiner* — Joe H Cheng

(57) ABSTRACT

The present invention discloses a wireless remote network management system for wirelessly interfacing a series of remote devices (e.g., computers, servers, etc.) to one or more user workstations. Each remote device is coupled to a wireless transmitter, and each user workstation includes a wireless user station coupled to a keyboard, a video monitor and a cursor control device (e.g., a mouse). Preferably, the transmitters and user stations utilize an 802.11 compatible ad-hoc network for communication. Alternatively, a central wireless access point may be utilized to centralize communications between the transmitters and user stations. The wireless network enables a user workstation to access, monitor and control a remote device. An option menu containing a list of all the remote devices allows a user to select any of the remote devices for operation.

21 Claims, 7 Drawing Sheets

(56) References Cited

U.S. PATENT DOCUMENTS

| | | | |
|---|---|---|---|
| 6,304,895 B1 * | 10/2001 | Schneider et al. | 709/203 |
| 6,330,595 B1 | 12/2001 | Ullman et al. | |
| 6,333,750 B1 | 12/2001 | Odryna et al. | |
| 6,343,313 B1 | 1/2002 | Salesky et al. | |
| 6,345,323 B1 | 2/2002 | Beasley | |
| 6,363,062 B1 | 3/2002 | Aaronson et al. | |
| 6,373,850 B1 | 4/2002 | Lecourtier et al. | |
| 6,378,014 B1 | 4/2002 | Shirley | |
| 6,388,658 B1 * | 5/2002 | Ahern et al. | 345/168 |
| 6,389,464 B1 | 5/2002 | Krishnamurthy et al. | |
| 6,408,334 B1 | 6/2002 | Bassman et al. | |
| 6,445,818 B1 | 9/2002 | Kim et al. | |
| 6,532,218 B1 | 3/2003 | Shaffer et al. | |
| 6,535,983 B1 | 3/2003 | McCormack | |
| 6,539,418 B2 | 3/2003 | Schneider et al. | |
| 6,564,380 B1 | 5/2003 | Murphy | |
| 6,567,813 B1 | 5/2003 | Zhu et al. | |
| 6,567,869 B2 | 5/2003 | Shirley | |
| 6,571,016 B1 | 5/2003 | Mehrotra et al. | |
| 6,615,272 B1 * | 9/2003 | Ambrose | 709/238 |
| 6,621,413 B1 | 9/2003 | Roman et al. | |
| 6,622,018 B1 | 9/2003 | Erekson | |
| 6,664,969 B1 | 12/2003 | Emerson | |
| 6,675,174 B1 | 1/2004 | Bolle | |
| 6,681,250 B1 | 1/2004 | Thomas et al. | |
| 6,701,380 B2 | 3/2004 | Schneider et al. | |
| 6,728,753 B1 | 4/2004 | Parasnis et al. | |
| 6,771,213 B2 | 8/2004 | Durst et al. | |
| 6,772,169 B2 | 8/2004 | Kaplan | |
| 6,850,502 B1 | 2/2005 | Kagan et al. | |
| 6,952,495 B1 | 10/2005 | Lee | |
| 7,024,474 B2 | 4/2006 | Clubb | |
| 7,042,587 B2 | 5/2006 | Fiske | |
| 7,099,934 B1 | 8/2006 | Ewing et al. | |
| 7,117,266 B2 * | 10/2006 | Fishman et al. | 709/228 |
| 7,127,619 B2 | 10/2006 | Unger et al. | |
| 7,206,940 B2 | 4/2007 | Evans et al. | |
| 7,249,167 B1 | 7/2007 | Liaw | |
| 7,260,624 B2 | 8/2007 | Sivertsen | |
| 7,342,895 B2 | 3/2008 | Serpa et al. | |
| 7,382,397 B2 | 6/2008 | Mottur | |
| 7,502,884 B1 | 3/2009 | Shah et al. | |
| 7,555,567 B2 * | 6/2009 | Thomas et al. | 709/250 |
| 7,576,770 B2 | 8/2009 | Metzger et al. | |
| 7,818,480 B2 * | 10/2010 | Hoerl et al. | 710/62 |
| 7,827,258 B1 | 11/2010 | Kalbarga | |
| 7,853,663 B2 * | 12/2010 | Hoerl et al. | 709/208 |
| 7,853,740 B2 | 12/2010 | Liew | |
| 8,176,226 B2 | 5/2012 | Hsueh et al. | |
| 8,269,783 B2 * | 9/2012 | Shirley | 345/520 |
| 2002/0018124 A1 | 2/2002 | Mottur | |
| 2002/0038334 A1 | 3/2002 | Schneider | |
| 2002/0095594 A1 | 7/2002 | Dellmo | |
| 2002/0128041 A1 | 9/2002 | Parry | |
| 2002/0147840 A1 | 10/2002 | Mutton et al. | |
| 2002/0188709 A1 | 12/2002 | McGraw et al. | |
| 2003/0017826 A1 * | 1/2003 | Fishman et al. | 455/426 |
| 2003/0030660 A1 | 2/2003 | Dischert | |
| 2003/0037130 A1 | 2/2003 | Rollins | |
| 2003/0088655 A1 | 5/2003 | Leigh | |
| 2003/0092437 A1 | 5/2003 | Nowlin | |
| 2003/0112467 A1 | 6/2003 | McCollum et al. | |
| 2003/0135656 A1 | 7/2003 | Schneider | |
| 2003/0191878 A1 | 10/2003 | Shirley | |
| 2003/0217123 A1 | 11/2003 | Anderson | |
| 2004/0015980 A1 | 1/2004 | Rowen | |
| 2004/0042547 A1 | 3/2004 | Coleman | |
| 2004/0045030 A1 | 3/2004 | Reynolds et al. | |
| 2004/0062305 A1 | 4/2004 | Dambrackas | |
| 2004/0093401 A1 | 5/2004 | Buswell et al. | |
| 2004/0117426 A1 | 6/2004 | Rudkin | |
| 2004/0249953 A1 | 12/2004 | Fernandez | |
| 2005/0018766 A1 | 1/2005 | Iwamura | |
| 2005/0027890 A1 | 2/2005 | Nelson | |
| 2005/0030377 A1 | 2/2005 | Li | |
| 2005/0044184 A1 | 2/2005 | Thomas | |
| 2005/0094577 A1 | 5/2005 | Ashwood-Smith | |
| 2005/0104852 A1 | 5/2005 | Emerson | |
| 2005/0114894 A1 | 5/2005 | Hoerl | |
| 2005/0125519 A1 | 6/2005 | Yang | |
| 2005/0132403 A1 | 6/2005 | Lee | |
| 2005/0195775 A1 | 9/2005 | Petite | |
| 2005/0204082 A1 | 9/2005 | Thomas | |
| 2006/0083205 A1 | 4/2006 | Buddhikot | |
| 2006/0095539 A1 | 5/2006 | Renkis | |
| 2007/0079008 A1 * | 4/2007 | Leibovich et al. | 709/246 |
| 2010/0225658 A1 * | 9/2010 | Coleman | 345/547 |
| 2011/0063211 A1 * | 3/2011 | Hoerl et al. | 345/157 |

OTHER PUBLICATIONS

The International Search Report and Written Opinion for PCT/US04/29899 dated Aug. 31, 2006.
The International Search Report and Written Opinion for PCT/US05/40948 dated Jul. 20, 2006.
The International Search Report and Written Opinion for PCT/US05/07684 dated Sep. 25, 2007.
The International Search Report and Written Opinion for PCT/US06/12280 dated Mar. 14, 2007.
The International Search Report and Written Opinion for PCT/US05/25275 dated May 11, 2006.
Yueh-Feng Lee, A Configurable Java Architecture for Mobile Terminal Software Download, Wireless Communications Conference, WCNC2002 IEEE, Mar. 17-21, 2002, vol. 1, abstract.
The Office Action issued in U.S. Appl. No. 10/666,940.
The Office Action issued in U.S. Appl. No. 10/898,001.
The Office Action issued in U.S. Appl. No. 10/988,184.
The Office Action issued in U.S. Appl. No. 11/102,450.
File History of Reissue U.S. Appl. No. 5,732,212, Apr. 11, 2002. Part 1.
File History of Reissue U.S. Appl. No. 5,732,212, Apr. 11, 2002. Part 2.
File History of U.S. Appl. No. 10/032,325, Jun. 14, 2004.
Findings and Conclusions, *Apex* v. *Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent* v. *Raritan*, Civil Action No. 4435, Feb. 3, 2005.
Marksman Transcript, *Avocent* v. *Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.

(56) References Cited

OTHER PUBLICATIONS

Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
The extended European Search Report by the European Patent Office, mailed on Apr. 17, 2012, in the related European Application No. EP 06740384.0.
The extended European Search Report by the European Patent Office, mailed on Apr. 18, 2012, in the related European Application No. EP 05730955.1.
The extended European Search Report by the European Patent Office, mailed on Feb. 20, 2012, in the related European Application No. EP 05772143.3.
The extended European Search Report by the European Patent Office, mailed on Jan. 24, 2012, in the related European Application No. EP 04783929.5.
The Notice of Allowance, mailed on Jul. 25 & Sep. 1, 2011, in related U.S. Appl. No. 10/666,940, now U.S. Pat. No. 8,068,546.
Balaouras et al., "Potential and Limitations of a Teleteaching Environment based on H.323 Audio—Visual Communication Systems," Computer Networks, vol. 34, Issue 6, Dec. 2000, pp. 945-958.
The Office Action, mailed on Sep. 13, 2011, in related U.S. Appl. No. 12/881,255.
The Office Actions, mailed on Mar. 23, 2011, Feb. 1, 2012 and May 16, 2012, in related U.S. Appl. No. 12/947,743.
Sachin et al., "A Real-Time Interactive Virtual Classroom. Multimedia Distance Learning System," IEEE Transactions on multimedia, vol. 3, No. 4, Dec. 2001.
The Office Action, mailed on Sep. 15, 2011, in related U.S. Appl. No. 11/241,845.
Defendant Raritan Computer Inc.'s Response to Plaintiffs First Set of Post Remand Interrogatory Requirements to Raritan (No. 1R-16R). (Dec. 16, 2004).
The extended European Search Report mailed on Oct. 27, 2010 in the related European Application No. 05820759.8.
The Office Actions issued in the related U.S. Appl. No. 10/666,940 on May 24, 2006, Feb. 6, 2007 and Jun. 20, 2007.
The Office Actions issued in the related U.S. Appl. No. 10/666,940 on Feb. 22, 2008, Nov. 21, 2008 and May 11, 2009.
The Office Actions issued in the related U.S. Appl. No. 10/666,940 on Jan. 20, 2010, Nov. 15, 2010 and Apr. 11, 2011.
The Office Actions issued in the related U.S. Appl. No. 10/898,001 on Jun. 3, 2009.
The Office Actions issued in the related U.S. Appl. No. 10/988,184 on Sep. 14, 2007, Apr. 9, 2008 and Jun. 27, 2008.
The Office Actions issued in the related U.S. Appl. No. 10/988,184 on Feb. 19, 2009, Sep. 23, 2009 and Jun. 14, 2010.
The Office Actions issued in the related U.S. Appl. No. 10/233,299 on Aug. 4, 2005, Jan. 11, 2006, Jul. 24, 2006 and Jan. 4, 2007.
The Office Actions issued in the related U.S. Appl. No. 10/233,299 on Jan. 31, 2007, May 21, 2007, Jul. 13, 2007 and Jul. 19, 2007.
The Office Actions issued in the related U.S. Appl. No. 10/233,299 on Jul. 24, 2007, Oct. 29, 2007, Dec. 3, 2007 and Feb. 13, 2008.
The Office Actions issued in the related U.S. Appl. No. 10/233,299 on May 23, 2008, Jan. 23, 2009 and Oct. 21, 2009.
The Office Actions issued in the related U.S. Appl. No. 11/102,450 on Dec. 18, 2009 and Aug. 9, 2010.
The Office Actions issued in the related U.S. Appl. No. 11/241,845 on Jun. 4, 2008, Jan. 21, 2009, Jul. 31, 2009, Mar. 24, 2010 and Nov. 1, 2010.
Artimi Ltd., "UWB & Mesh Networks White Paper," Aug. 2003.
The Communication from the Examining Division by the European Patent Office, mailed on May 10, 2012, in the related European Application No. EP 04783929.5.
The Notice of Allowance, mailed on May 31, 2012, in related U.S. Appl. No. 12/881,255.
The extended European Search Report by the European Patent Office, mailed on May 3, 2012, in the related European Application No. EP 06816094.4.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621, 1994.
Apex et al, Products Brochure, APX 316848-316909, 1993.
Apex et al, Products Brochure, APX 316910-316969, 1987.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4 x P & 1 x P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.

(56) References Cited

OTHER PUBLICATIONS

Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2002).
Defendant Raritan Computer Inc.'s Claim Construction Statement (Dec. 15, 2004).
Defendant Raritan Computer Inc.'s Motion for Partial Summary Judgment (Jan. 18, 2005).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer, Inc.'s Response to Plaintiffs Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
Dei, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
Trial Transcript, *Apex* v. *Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket reports in the litigation: *Avocent Redmond Corp.* v. *Raritan Computer, Inc.*, Civil Action No. 1:01-CV-04435(PKC), United States District Court for the Southern District of New York.
Communication from the Examining Division of EPO, mailed on Apr. 30, 2013, in related EP Appl. No. 05772143.3.
Decision to refuse the application (Examining Division) of EPO, mailed on Feb. 21, 2013, in related EP Appl. No. 04783929.5.
Communication from the Examining Division of EPO, mailed on Dec. 18, 2013, in related EP Appl. No. 04783929.5.
Office Action mailed on Sep. 25, 2012 in related U.S. Appl. No. 12/947,743.
Notice of Allowances mailed on Nov. 23, 2012 and Mar. 1, 2013 in related U.S. Appl. No. 11/241,845.
Office Action mailed on Mar. 26, 2013 in related U.S. Appl. No. 12/728,998.
Anonymous: "Fletcher's checksum," wikipedia, 1982, retrieved from the Internet: http://en.wikipedia.org/wiki/Fletcher%27s_checksum.
Tran et al., "Multi-Bit Error Vulnerabilities in the Controller Area Network Protocol," 1999, retrieved from the Internet: http://www.ece.cmu.edu/~koopman/thesis/etran.pdf.

\* cited by examiner

SWITCHLESS KVM NETWORK WITH WIRELESS TECHNOLOGY

FIELD OF THE INVENTION

The present invention relates to a wireless network management system for remotely monitoring and controlling network and computer equipment from one or more local user workstations over a wireless network. Specifically, a keyboard, video monitor, and cursor control device coupled to a wireless-enabled user workstation are utilized to wirelessly access and control host devices coupled to wireless transmitters without the need to install additional software on the host device.

BACKGROUND OF THE INVENTION

In a typical computer environment, a Local Area Network ("LAN") allows for one or more computer servers to be connected to several computers such that the resources of each server are available to each of the connected computers. The LAN is typically comprised of networking equipment such as routers, hubs, switches, etc. In such a configuration, a dedicated keyboard, video monitor and mouse may be employed for each computer and computer server.

To maintain proper operation of the LAN, the system administrator must maintain and monitor the individual networking equipment, servers, and computers. This maintenance frequently requires the system administrator to perform numerous tasks from a user console connected to the networking equipment, server, or computer. For example, to reboot a computer or to add or delete files, the system administrator is often required to operate the server or computer from its local user console, which may be located at a substantial distance from the system administrator's computer and from other computers or servers connected to the LAN. Therefore, to accomplish the task of system administration, the system administrator must often physically relocate to access the local user consoles of remotely located servers and computers.

As an alternative, dedicated cables may be installed from each remotely located server and computer to the system administrator's user console to allow the system administrator to fully access and operate the remote computer equipment. However, this alternative requires substantial wiring and wire harnessing, both of which may require tremendous cost. Additionally, as the distance between the system administrator's user console and the remote computer equipment increases, a decrease in the quality of the transmitted signal often results. Thus, dedicated cables between the system administrator's user console and remote computer equipment may not be a feasible alternative.

In some situations, it is desirable to manage the networking equipment, servers, and computers remotely located from the system administrator. For example, a software program such as pcAnywhere may be utilized to access a remote computer over the Internet or a LAN utilizing the keyboard, video monitor, and cursor control device (e.g., a mouse) attached to a local user workstation. Remote computer access programs, such as pcAnywhere, typically require that host software is installed on the remote computer and client software is installed on the user workstation. To access a remote computer, a user of the user workstation selects the desired remote computer from a list and enters the appropriate username and password. Once access has been granted to the remote computer, the user utilizes the keyboard, video monitor, and cursor control device attached to the local user workstation to access and operate the remote computer.

Hardware solutions also exist for operating a remote computer from a user workstation over a LAN or through a dedicated network. In contrast to the software solutions, the hardware solutions do not typically require host and/or client software. Instead, the hardware solutions typically utilize a keyboard, video monitor, and mouse ("KVM") switch which is accessible over a LAN via a common protocol, such as transfer control protocol/Internet protocol ("TCP/IP"). Generally, a user or system administrator access the remote computers attached to the KVM switch utilizing an Internet browser or client software associated with the KVM switch. Once the remote computer has been selected, the remote computer's video signal is routed to the user workstation's video monitor and a user may then utilize a keyboard and/or mouse to control the remote computer. The KVM switch may additionally include a connection to the power source of the remote computer for a hard reboot in case of system failure.

The aforementioned hardware and software solutions generally utilize a compression algorithm to reduce the necessary bandwidth required to transmit the video signals. For example, the wireless remote network management system of the present invention may utilize the compression algorithm disclosed in application Ser. No. 10/233,299, which is incorporated herein by reference, to reduce and compress the digital data that must be transmitted to the remote computers and/or video display devices. Alternatively, the system of the present invention may utilize standard video compression algorithms such as MPEG-2 or MPEG-4.

A keyboard, video monitor, and mouse ("KVM") switching system may be utilized to allow one or more user workstations to select and control any one of a plurality of remote computers via a central switching unit. Such systems are well known in the art and have been used by system administrators for at least ten years. KVM switching systems allow system users to control remote computers using one or more local user workstations' keyboard, video monitor, and cursor control device as if these local devices are directly connected to the remote computer. In this manner, a system user may access and control any of a plurality of remote computers, such as servers, from a single location (i.e., the location of the user workstation). The system user may select a specific remote computer to access or control using any one of a variety of methods known in the art including pushing a button that corresponds with the desired remote computer and is located on the face of a computer management system component, selecting the computer from a list displayed on a computer management system component's LCD or LED display, pressing one or more hot keys on the local user workstation's keyboard (e.g., F1, ALT-F1, F2, etc.), selecting the remote computer from a list displayed on the user workstation's monitor by pointing to it or scrolling to it using the user workstation's keyboard and/or cursor control device, etc.

Recently there has been a proliferation of wireless technologies to enable computers to communicate and share resources. For example, the Bluetooth and IEEE 802.11 standards are two rapidly developing technologies that allow computers to wirelessly communicate. Devices are commercially available that comply with the 802.11 standard and enable wireless TCP/IP communications over distances of up to three hundred (300) feet. For example, PCMCIA wireless cards enable laptops to communicate utilizing the TCP/IP protocol. 802.11 compatible wireless local area networks ("WLANs") are now often utilized in lieu of, or in conjunction with, local area networks. Bluetooth devices are generally utilized for shorter range communication, utilizing lower transmission rates than 802.11 compliant devices.

The 802.11 standard, ratified by the Institute of Electrical and Electronics Engineers (IEEE) in 1997, is a wireless communications standard generally utilized for networking, file sharing and Internet connection sharing. In 1999, two extensions to the 802.11 standard were added, 802.11a and 802.11b. The 802.11a standard operates in a frequency range of 5 Gigahertz (GHz) at speeds of up to 54 Megabits per second (Mbps). The 802.11b standard (also known as WiFi), was designed to be more affordable, and operates in the 2.64 GHz range at speeds of up to 11 Mbps. With the proliferation of 802.11b devices, the 802.11g standard was recently ratified which allows for 802.11a speeds in 802.11b compatible frequencies.

All 802.11 standards allow for computers to communicate wirelessly without the need for hubs, routers, switches, etc. The 802.11 standard allows for the creation of WLANs, which use the same TCP/IP communication protocols as traditional wired LANs. With commercially available wireless communication devices, two computers can communicate from up to three hundred (300) feet away, although with repeaters, stronger antennae, signal boosters, etc., this range can be increased. Today, wireless networks are available in airports, coffee shops, college campuses, etc.

Importantly, the 802.11 standard allows for at least two different network configurations: (1) an infrastructure mode in which all traffic passes through a wireless "access point", and (2) an "ad-hoc" mode (or "peer-to-peer" mode) in which computers communicate without any central device. Independent of the mode, the 802.11 standard supports wireless networks that offer the same communications (e.g., TCP/IP, file sharing, Internet sharing, etc.) as a wired connection.

In the infrastructure mode, devices communicate through a wireless access point. An access point is similar to a hub, or router (but without wires), in that it receives and transmits all data between wireless devices. Advantages of the infrastructure mode include increased scalability, increased range of communication, and access to a wired network. Specifically, by adding access points, the network can grow without undo burden on any one device. An access point can also be utilized to increase the range of communications. Cascading access points and signal boosters can overcome the three hundred (300) foot communication limit of most 802.11 devices. Finally, traditional access points also offer access to a wired network. Therefore, an infrastructure network easily adapts to communicate with an Ethernet LAN or an Internet connection.

An ad-hoc network is more dynamic—it can be created and torn-down easily without any additional hardware. Computers can enter and leave the network so long as the computer is configured to access a wireless network with the same service set identifier (SSID) as the other computers in the network. Generally, an SSID is a sequence of alphanumeric characters that identifies the ad-hoc network. The ad-hoc network also has the advantage that it requires no external hardware. An ad-hoc network can be created with multiple computers alone, so long as each computer has a WiFi compatible communications device.

An important feature of the 802.11 standard is the availability of multiple channels of communications, utilizing Direct Sequence Spread Spectrum (DSSS) technology, to allow for this feature. DSSS is a technology that allows for the transmission of data over a range of frequencies thus decreasing the power utilized at any one frequency. Therefore, DSSS allows for fast communications with little interference. Thus, DSSS permits an 802.11 network to include multiple communications channels. Further, the wireless network can co-exist with other wireless devices that operate in similar frequency ranges.

Generally, in an ad-hoc network, one of the available channels (the FCC currently allows for eleven (11) total channels) is utilized as a "broadcast" channel. The broadcast channel allows devices to "discover" other devices in range of communication and to transmit messages that are received by all devices. Thus, the broadcast channel is a critical feature of the 802.11 standard that allows for the creation of ad-hoc networks in which devices can automatically join and leave the network. The network then utilizes one of a variety of algorithms such as a spokesman election algorithm (SEA) or a broadcast/flooding algorithm for all other communications. In SEA, one computer is "elected" to head the network and tracks the addition of other computers to and from the network. In a broadcast/flooding algorithm, generally all messages are sent to all computers. If an access point is utilized, then no such algorithms are necessary, and instead, the access point can be utilized to ensure that all messages reach the correct destination.

Systems that enable wireless access of a remote device are currently known in the art of computer management. For example, one such system comprises a single receiver and a single transmitter that, together, allow a user to access a remote computer using a keyboard, video monitor, and mouse. In this system, both the receiver and the transmitter are enabled for wireless communication. The receiver, coupled to the keyboard and mouse, receives keyboard and mouse data and wirelessly transmits this data to the transmitter. The transmitter is coupled to a remote computer and supplies the data to the keyboard and mouse ports of this remote computer. Simultaneously, the transmitter receives video data from the remote computer and transmits this data wirelessly to the receiver where it is displayed on the video monitor coupled to the receiver. Thus, this system enables extended length access of a single remote computer through a wireless connection.

Another known system consists of a switching device for controlling multiple remote computers where the switching device comprises a wireless transmitter and a wireless receiver. The switching device is configured to enable a user to select from among multiple computing devices and wirelessly link a peripheral device with a selected computing device for user interaction. In this system, the switching device initially develops a list of available computing devices. A user chooses from this list and the switching device establishes a wireless link with the corresponding computing device. Thus, this wireless switch only enables one connection between a user and a remote computer at any instance. Further, each of the computing devices must also have wireless communications capabilities to enable wireless communication with the switch.

A method for switching the utilization of a shared set of wireless I/O devices between multiple computers is also known. This method includes the utilization of a software based switching mechanism where wireless protocols enable the sharing of wireless peripheral devices between multiple computers. A wireless data packet (a "token") is utilized to transfer control of the I/O devices utilizing a "master", "slave" relationship for the transfer of control. The token is the form of computer-to-computer wireless command utilized to transfer control of a wireless peripheral device from one device to another. Thus, in this known system, server-to-server communications are necessary for transferring the control of a wireless peripheral. Further, in this system only one computer can control a set of wireless peripherals at a time.

In another known system for accessing computer systems in a computer network, each computer system provides and receives operator interface data signals containing user output and input information. Central to this system is a wireless administrator device that allows a system operator to remotely control a plurality of computer systems interconnected through a communications network. The wireless administrator device includes a wireless communications module that operates in "transmit" and "receive" modes to communicate with the wireless communication modules coupled to the computer systems. The wireless administrator device includes an operator interface with a video display, mouse and keyboard to enable user interaction in a selection mode or a control mode. The interface includes a manual connect button that allows the administrator to display on the video a list of available computer systems that may be accessed. Upon selection of a computer, the administrator remotely controls the computer through the operator interface.

Finally, systems are also known that provide a wireless interface between a remote host computer and a personal digital assistant (PDA). In one such system, the PDA presents the user with a graphical user interface (GUI) allowing for input by way of a passive stylus, which can be used in a pen mode or a mouse mode. The PDA also includes a transceiver that communicates wirelessly with the transceiver of a remote computer. The transceivers allow the wireless device to access the remote host computer over a wireless LAN or through a peer-to-peer network. The system also allows a user to view available remote host computers through the GUI of the wireless device and to access the programs and files of the remote computer. The remote computer in turn, transmits display commands to the wireless device. A similar system utilizes Bluetooth communications to enable a PDA to recognize and identify all compliant remote devices by transmitting a broadcast message that is received by compliant remote devices. In this system, the PDA includes a GUI to display a rendering of a mechanism that can be utilized to control a remote device. For example, the rendering might be of an on/off switch. The PDA receives input from a stylus, and translates this input into a command for the remote device.

In view of the foregoing, a need clearly exists for a wireless remote network management system capable of wirelessly operating and controlling networking equipment, servers, and computers. Furthermore, such a system should allow a user to view all available remote computers via an on-screen user interface and to choose one of these computers to monitor and control. The system should aid in managing remote computing environments, thereby reducing the need to have an on-site system administrator. Finally, the system should obviate the need for any central switches, hubs, routers, or extended length cables.

SUMMARY OF THE INVENTION

It is often convenient to control one or more connected computers from one local set of peripheral devices (i.e., keyboard, video monitor, cursor control device, etc.). Since the majority of computers in use today incorporate or are designed to be compatible with commonly known and used computer technologies (e.g., IBM, Apple, Sun, etc.), many computers use identical or similar electrical connectors to connect a peripheral device. Also, a computer typically contains a dedicated electrical connector for each type of peripheral device to which the computer will be connected. Generally, the cables that connect such peripheral devices to a computer are approximately six feet in length, thereby limiting the distance from the computer at which the peripheral devices may be located.

In many circumstances, it is desirable to separate the peripheral devices from the computer due to space constraints. However, one skilled in the art may readily appreciate that separating a computer from its peripheral devices may make it difficult to locate the remote computers because they are commonly located in another area of the building, such as in a data center, server-farm, etc. Unless each device is clearly labeled, there exists no means of differentiating computers without their attached peripheral devices.

In addition to extending the distance between a computer and its peripheral devices, it is also convenient to access and operate more than one computer from one set of peripheral devices. Again, this feature is desirable when space is limited. It may also be desirable to access a computer through wireless communications. In many situations it is difficult to run wires from the location of a server to its set of peripherals. Further, the utilization of longer wires necessarily leads to the degradation of the signals transmitted. For example, the high frequency components of such transmitted signals are often severely attenuated.

The present invention provides a wireless remote computer management system for administrating remote computers and devices from one or more local wireless-enabled user workstations. Each wireless-enabled user workstation comprises a wireless user station ("WUST") with attached peripheral devices including a keyboard, video monitor, cursor control device, etc. The wireless remote management system of the present invention does not require any central switches, cables, wires, etc. Optionally, an access point or hybrid switch can be used to increase the scalability of the invention. Instead, a peer-to-peer wireless network is preferred to enable WUSTs to monitor and control remote computers, servers, networking equipment, etc.

In the system of the present invention, a user workstation comprises a WUST coupled to a keyboard, monitor, and cursor control device (e.g., a mouse) that utilizes wireless communications to communicate with a wireless-enabled computer interface module ("WCIM") that is interfaced with a remote computer. The WCIM includes wireless capabilities and connects to the keyboard, monitor and cursor control device ports of a remote computer. The present invention allows a user to view a list of available remote computers and to select a remote computer from this list for control. The list may be automatically updated as remote computers enter or exit the wireless network.

In the present invention, each remote device (e.g., networking equipment, server, computer, etc.) is connected to a WCIM. The WCIM can also have serial ports for connection to the networking equipment as well as keyboard, video, and cursor control device ports for connection to the servers and computers. The WCIM may also contain USB ports, parallel ports, etc., and a port for connection to a power supply capable of controlling the power to the networking equipment, server, or computer. Standard cabling is utilized to connect the networking equipment, server, or computer to the appropriate ports on the WCIM.

Central to the present invention is the wireless communications which enable the WUSTs to communicate with the WCIMs. Preferably, the WUST and WCIM utilize the 802.11 protocol and 802.11 compliant hardware to communicate through an ad-hoc peer-to-peer wireless network. Utilizing this communication, the WUSTs are automatically "aware"

of all available remote computers coupled to WCIMs. Further, this communication is utilized by the WUST to request a connection to the WCIM, and upon completion of the connection, to receive compressed video data from the WCIM. In turn, the WUST sends data including keyboard and cursor control device data packets, serial data, USB control data, etc. to the WCIM. The WCIM utilizes this data to emulate mouse, keyboard, USB, etc., signals to the associated remote device.

Each WCIM and WUST utilizes an 802.11 compliant wireless device configured with the same service set identifier (SSID). Utilizing the broadcast channel available as part of the 802.11 standard, the WUSTs can discover all available WCIMs (i.e., the user workstations can discover all available remote computers, servers, hubs, etc.), and the WUST can determine the state of each remote computer (i.e., if the remote computer is being controlled by a different user workstation).

The WUST and WCIM also utilize the broadcast channel to set up a connection. The WUST requests a connection by sending a message over the broadcast channel, and the WCIM either accepts or denies the request. After a connection is established, the WUST and WCIM communicate on a non-broadcast channel. Preferably, this channel is selected by the WUST and identified as part of a request message. The WCIM receives video signals from the remote computer, compresses the video signals, and transmits compressed video information to the WUST. In turn, the WUST transmits keyboard and cursor control device data wirelessly to the WCIM. The WCIM utilizes this data to provide emulated keyboard and cursor control device data to the keyboard and cursor control device ports of the remote computer. The WUST decompresses the video information and provides video signals to the local monitor. In this manner, a user of the workstation can control the remote computer by utilizing the local keyboard and cursor control device, while viewing video signals from the remote computer on the local monitor.

An important feature of the present invention is the ability to display a list of available remote computers to a user on the user's local monitor. Because the present invention is compatible with an ad-hoc wireless network, this list can be updated or refreshed automatically as remote computers enter or leave the network. It can also be updated as computer become available for control (i.e., a different user relinquishes control). A variety of methods may be utilized to generate and display the option menu. Preferably, the WUST includes a central processing unit (CPU) that generates an option menu. Alternatively, an onscreen display (OSD) processor may be utilized. In one embodiment the WUST can be implemented as a purely software solution, and can be run on any computer/laptop/PDA, etc. that has wireless (802.11) communication capabilities. In this embodiment, the option menu may be implemented as part of the WUST software, and it can take advantage of existing APIs to display the option menu in a user-friendly fashion.

Although the present invention preferably utilizes an 802.11 peer-to-peer network, the WUST and WCIM can also communicate through an access point, or a wireless KVM switch. Importantly, the wireless KVM switch can be a hybrid switch thus supporting both wired and wireless connections. In this configuration, a WUST can communicate with a WCIM, even if the WCIM does not have wireless capabilities. That is, the WCIM can connect to the hybrid switch utilizing traditional cabling, and, in turn, the switch can communicate over an 802.11 connection with the WUST. Because both the wired and wireless communication devices utilize TCP/IP communications, the hybrid switch does not need to interpret or translate the data. Another advantage of the utilization of an access point is the ability of the access point to connect to the Internet. Thus, a user workstation with Internet connectivity can connect to the access point remotely and in turn, control a remote computer. In this embodiment there is no restriction on the location of the user workstation. Further, the user workstation is not required to have wireless capabilities.

Therefore, it is an object of the present invention to provide an improved wireless computer management system that enables a user to control remote computers or devices from local user workstations.

Further, it is an object of the present invention to provide a wireless computer management system that allows one or more local user workstations to access and control remote devices utilizing a peer-to-peer wireless network.

It is yet another object of the present invention to provide a wireless computer management system that allows a local user workstation to wirelessly control a remote device utilizing a local keyboard and cursor control device, and to wirelessly receive video signals from the remote device.

It is another object of the present invention to provide a switch-less KVM network.

Additionally, it is an object of the present invention to provide a wireless KVM network that enables a user workstation to provide a list of available remote computers and devices wherein the list is automatically updated as remote computers and devices become available.

Further, it is an object of the present invention to provide a modular, wireless, computer management system that allows one or more sets of peripheral devices to access and operate one or more remote computers as if the local peripheral devices were directly connected to the remote computers.

Furthermore, it is an object of the present invention to allow information technology ("IT") personnel to easily manage a volume of servers for both small-scale computer centers and large-scale computer centers such as data-centers, server-farms, web-hosting facilities, and call-centers.

In addition, it is an object of the present invention to provide a wireless modular computer management system that eliminates the need for a set of peripheral devices for each remote computer thereby minimizing the space required to house the remote computers.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
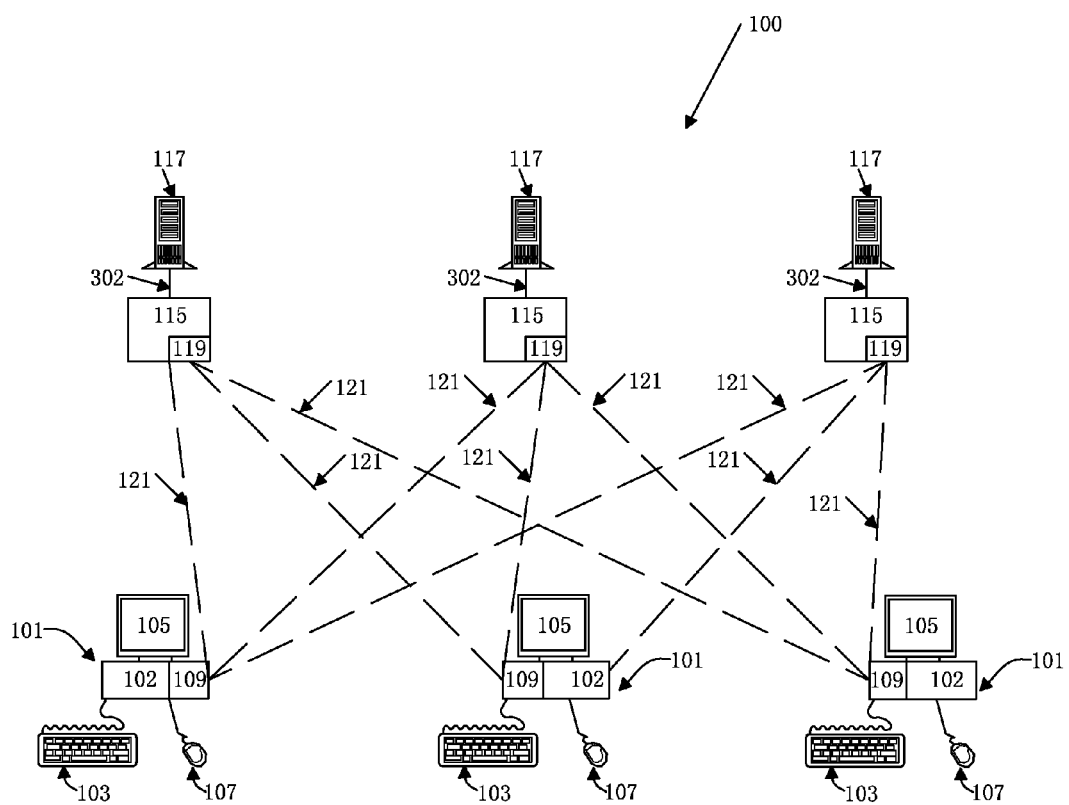
FIG. 1 is a schematic representation of the computer management system according to the preferred embodiment of the present invention illustrating the wireless connection of a user workstation to a remote computer, where each user workstation comprises a wireless-enabled user station (WUST) coupled to a keyboard, monitor and cursor control device and each remote computer is directly connected to a wireless-enabled computer interface module (WCIM).

Referring first to FIG. 1, depicted is the architecture of the preferred computer management system in accordance with the present invention. Specifically, wireless computer management system 100 is shown including multiple user workstations 101 each having a wireless-enabled user station (WUST) 102 coupled to a keyboard 103, video monitor 105, and cursor control device 107. Each WUST 102 includes a wireless communications device 109 that is preferably an 802.11 compliant device, although other known standards may be utilized. Also included in computer management system 100 are a plurality of remote computers 117, each directly connected to an associated wireless computer interface module (WCIM 115). Each WCIM 115 has a wireless communications device 119 to communicate with one of a plurality of WUSTs 102. During operation, WUST 102, using the wireless communications device 109, communicates wirelessly with any one of the plurality of WCIMs 115. Specifically, WUST 102 transmits keyboard and cursor control device signals, preferably as TCP/IP data packets, over wireless communications path 121 to a select WCIM 115. Simultaneously, WCIM 115 transmits compressed video data signals, also preferably as TCP/IP data packets, over wireless communications path 121 to WUST 102. Thus, the system of the present invention enables a user at user workstation 101 to view and control any one of a plurality of remote computers 117 via wireless communications path 121.

Although 802.11 compliant wireless communications is the preferred wireless standard for use with the present invention, other types of wireless connections such as infrared communications or Bluetooth compliant communications may be utilized, depending on the specific needs of the system user. 802.11 compliant communications is preferred because it allows for the creation of a peer-to-peer wireless local area network ("WLAN"), where devices (e.g., WUSTs 102) automatically discover other devices (e.g., WCIMs 115) in the network. Further, the 802.11 standard enables communications over extended distances where the speed of the signal can automatically be reduced as the distance increases thus avoiding excessive degradation of the signal. Additionally, standard radio communications utilized in 802.11 standards do not require line-of-site communications. Finally, the 802.11 standard enables the system of the present invention to utilize TCP/IP communications, therefore enabling the establishment of a WLAN network without extensive software development.

In the preferred embodiment of the present invention, any one of a number of user workstations 101 can connect with any one of a number of remote computers 117. By configuring all WCIMs 115 and WUSTs 102 with the same service set identifier (SSID), WCIMs 115 and WUSTs 102 can automatically "discover" other devices within range of communications. For many commercially available 802.11 compliant devices, the maximum range of communications is three hundred (300) feet.

In the alternative, one or more wireless access points can be utilized if it is desired to have the wireless-enabled devices to communicate through an infrastructure network rather than an ad-hoc network. In this configuration, discussed in greater detail with respect to FIG. 5 below, all data communications between WCIMs 115 and WUSTs 102 are handled by an access point. Utilizing an access point, the range of communications can be increased (cascading access points can increase the range even further). However, the use of an access point necessarily increases cost because such a configuration requires additional hardware.

Regardless of the type of wireless network utilized, one of its primary purposes is to allow a user at a user workstation 101 to select and subsequently control a remote computer 117. This selection may be accomplished through a variety of methods. In one embodiment, a menu or list of available remote computers 117 is displayed on the screen of video monitor 105. WUST 102 can utilize information provided by the wireless network to update the option menu displayed to the user with a list of available remote computers. The option menu may also give the user the ability to manually adjust video settings to improve the quality of the transmitted video.

Figure 2:
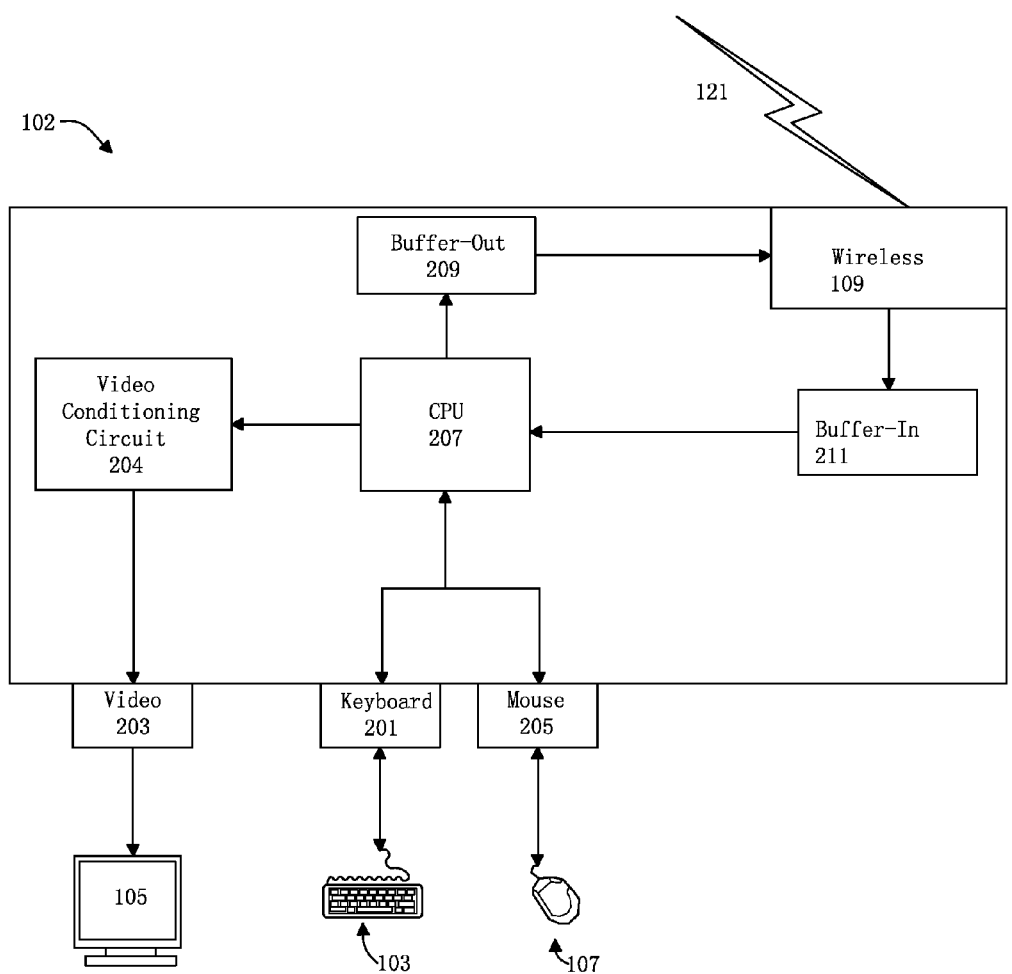
FIG. 2 is a schematic representation of the WUST shown in FIG. 1 according to the preferred embodiment of the present invention illustrating a block diagram of the internal structure of the WUST and connectors for a keyboard, video monitor, and cursor control device.

Referring next to FIG. 2, depicted is a block diagram of the preferred embodiment of WUST 102. WUST 102 interfaces keyboard 103, video monitor 105, and cursor control device 107 (although additional and/or other peripheral devices may also be used such as USB peripherals, serial devices, etc.) in order to control any of a plurality of remote computers 117 (FIG. 1). Keyboard 103, video monitor 105, and cursor control device 107 are preferably connected to keyboard port 201, video port 203 and cursor control device port 205 of WUST 102, respectively, using industry standard connectors and cabling. For example, the keyboard and cursor control device may be connected utilizing PS/2 connectors, serial connectors, Universal Serial Bus connectors, etc. Monitors are typically connected to a computer through a DB15 port.

During operation, WUST CPU 207 receives the keyboard and cursor control device signals generated by keyboard 103 and cursor control device 107, respectively, at the local user workstation via keyboard port 201 and cursor control device port 205, respectively. WUST CPU 207 interprets these signals and generates data packets that include data representative of the keyboard and cursor control device information from the received keyboard and cursor control device signals. The data packets are combined with other information (such as destination information) and are included in TCP/IP communications sent by wireless device 109 over wireless communications path 121 to WCIM 115. Wireless device 109 may receive the packets from CPU 207 through a buffer (i.e., buffer-out 209). Alternatively, CPU 207 may directly connect to wireless device 109.

Keyboard and cursor control device signals may be transmitted bidirectionally in the wireless remote management system of the present invention. That is, these signals can also be transmitted from remote computer 117 to user workstation 101. In this direction of transmission, keyboard and cursor control device signals are received as part of the data transmitted to wireless device 109 over wireless communications path 121, and can be temporarily stored in buffer-in 211. WUST CPU 207 uses this information to emulate or interpret the keyboard and cursor control device signals from remote computer 117. These signals can be utilized to, inter alia, determine if the remote computer is responsive to the user's cursor control device and keyboard.

Unidirectional digital compressed video signals are received by wireless device 109 as part of TCP/IP data. As discussed below (FIG. 3), WCIM 115 includes hardware and software to digitize and compress video received from remote computer 117. This compressed data is received by wireless device 109, and may be temporarily stored in buffer-in 211. WUST CPU 207 receives the compressed video data and transmits this data to video conditioning circuit 204 where it is decompressed and converted to an analog format compatible with video monitor 105. The system of the present invention may utilize the decompression method described in application Ser. No. 10/233,299. The analog video data is sent to video monitor 105 through video port 203.

The user selects a computer for control by choosing from the computers on the menu. Preferably, WUST CPU 207 is a general purpose processor that can be programmed to output an option menu to monitor 105. A general purpose processor can utilize existing application program interfaces ("APIs") to present a user friendly (e.g., with extensive graphics) interface to the user. Alternatively, the option menu can be generated by circuitry within WUST 102. For example, WUST 102 may include an on-screen display (OSD) processor. The OSD can be instructed by a microprocessor to display a list of available remote computers 117. However, because most commercially available OSDs are character based, providing only a rudimentary interface to the user, a general purpose processor is preferred.

A feature of the present invention is the ability to include an up-to-date list of remote computers that are available for control. Preferably, the list is generated by utilizing identification information transmitted with a broadcast message by WCIM 115. For example, the identification information may include the name of the remote computer, the type of computer, or other identification information (e.g., the IP address of the computer). This identification information can also be used to logically arrange the available remote computers 117 in groups or trees to present an efficient interface for the user to search for and select a remote computer. The option menu may also display information about computers currently controlled by other user workstations 101.

To switch to another connected device, the user preferably depresses a "hotkey" on keyboard 103 such as "printscreen" or "F1" on keyboard 103 attached to WUST 102 (FIG. 1). This causes WUST 102 to display the option menu on video monitor 105 thus allowing a user to select a new remote computer 117.

The option menu produced on the video screen may refresh automatically as remote computers 117 enter and exit the network. Alternatively, the option menu may refresh every time a user wishes to be interfaced with a different remote computer 117.

Although depicted as a hardware device, WUST 102 may be a standard personal computer that utilizes a standard operating system such as Microsoft Windows, UNIX, LINUX, etc. In this embodiment, WUST 102 is a computer equipped with wireless capabilities. Video monitor 105, keyboard 103, and cursor control device 107 communicate with WUST 102 utilizing standard connections well known in the art. Instead of utilizing WUST CPU 207, the functionality of WUST 102 is implemented as a software program. Specifically, the software program utilizes wireless LAN capabilities to determine what remote computers 117 are available. The software receives broadcast messages from its wireless connection and generates an option menu for the user.

An advantage of a software based implementation is that standard software APIs can be utilized to generate the option menu. Further, the menu can have a look and feel that is more familiar to the user (e.g., if Microsoft development software or Java APIs are utilized, the menu will resemble other Windows or Java applications). Utilizing commonly available APIs, the option menu can have graphics, icons, pull-down menus, etc. to present a more user-friendly interface.

As with the hardware solution, the software recognizes the user's selection of remote computer 117, and transmits a request to the appropriate WCIM 115. The WCIM 115 can accept or deny the request. If the request is accepted, the WCIM 115 and WUST 102 communicate over a channel of the wireless network.

Figure 3:
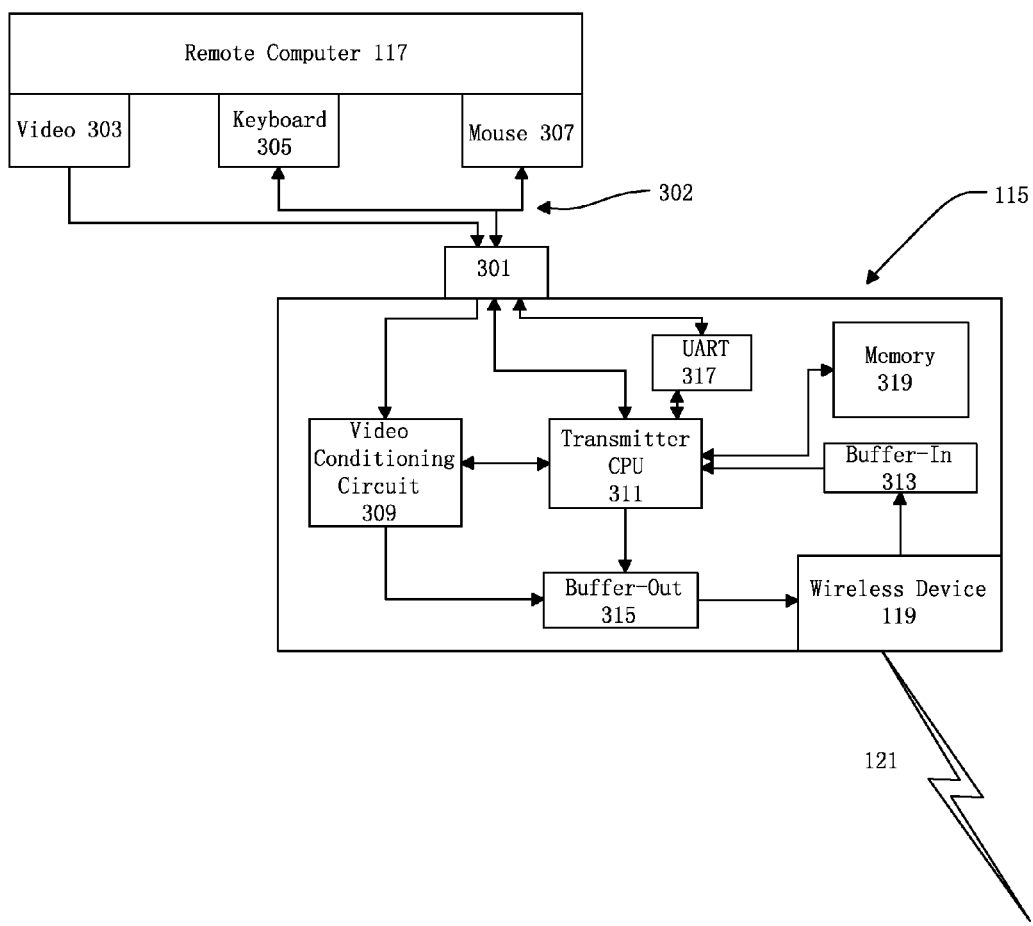
FIG. 3 is a schematic representation of the WCIM shown in FIG. 1 according to the preferred embodiment of the present invention illustrating a block diagram of the internal structure of the WCIM and connectors for a keyboard port, a video monitor port, and a cursor control device port.

Referring next to FIG. 3, depicted is the preferred embodiment of WCIM 115 according to the present invention. WCIM 115 includes KVM port 301 to communicate with video port 303, keyboard port 305, and cursor control device port 307 of remote computer 117. During normal operation, WCIM 115 receives video signals unidirectionally from remote computer 117 through cable 302. WCIM 115 also transmits keyboard and cursor control device signals to keyboard port 305 and cursor control port 307 through cable 302. Alternatively, each of video port 303, keyboard port 305 and cursor control device port 307 can be connected to WCIM 115 utilizing separate cables for each port. Additional connections, e.g., serial, USB, parallel port, etc. may also be utilized.

Keyboard and cursor control device signals are wirelessly transmitted bi-directionally between remote computer 117 and WUST 102. Video signals are unidirectionally transmitted from remote computer 117 to WUST 102. To accomplish the transmission of video, keyboard, and cursor control device data, WCIM 115 preferably includes video conditioning circuit 309, WCIM CPU 311, buffer-in 313, buffer-out 315, UART 317, memory 319, and wireless device 119. Wireless device 119 enables WCIM 115 to communicate over wireless communications path 121 with a WUST 102.

During operation, video signals are transmitted from video port 303 of remote computer 117 to KVM port 301 of WCIM 115 via cable 302. From KVM port 301, the unidirectional video signals are transmitted to video conditioning circuitry 309 which converts the analog video to compressed digital video data. Wireless communications path 121 has a limited bandwidth (e.g., 54 megabits/second) and is limited to the transmission of digital data. Therefore, video conditioning circuit 309 is necessary to enable transmission of video data in accordance with the system of the present invention. Video conditioning circuit 309 preferably utilizes the compression method and hardware described in co-pending application Ser. No. 10/233,299, which is incorporated herein by reference. This method utilizes a compression algorithm that takes advantage of the spatial and temporal redundancies typical of the video output of a remote computer. The method also utilizes algorithms that encode the red, green and blue components of the video signal for transmission over a digital connection. The digitized and compressed video, which may be temporarily stored in buffer-out 315, are transmitted by wireless device 119 to WUST 102 over wireless communications path 121.

Keyboard and cursor control device signals received from keyboard port 305 and cursor control device port 307, respectively, are transmitted via cable 302 to KVM port 301, whereupon the signals are sent to WCIM CPU 311. WCIM CPU 311 creates data packets based upon information received from keyboard port 305 and cursor control device port 307. These data packets, which may be temporarily stored in buffer-out 315, are transmitted to WUST 102 by wireless device 119 utilizing TCP/IP data sent over wireless communications path 121.

Conversely, wireless device 119 receives data packets from WUST 102 through wireless communications path 121 that contain data related to a user's utilization of keyboard 103 and cursor control device 107. These data packets may be temporarily stored in buffer-in 313, and are ultimately sent to WCIM CPU 311. WCIM CPU 311 interprets the data packets received from WUST 102 and generates emulated keyboard and cursor control device signals. These emulated signals are sent to KVM port 301 through UART 317. Specifically, UART 317 converts data from WCIM CPU 311 into a serial protocol understood by keyboard port 305 and cursor control device 307.

WCIM 115 also contains memory unit 319, which stores identification information for WCIM 115 and its connected remote computer 117 including the assigned name, group, address, etc. This identification information is sent by wireless device 119 to WUST 102 for purposes of providing the user a list of available remote computers 117. Further, the identification information can be utilized in the routing of wireless data to the correct WCIM 115.

In the preferred embodiment, remote computer 117 provides power to WCIM 115. Thus, the equipment and cabling required for a dedicated WCIM power source is eliminated saving space and money.

Preferably, WCIM 115 is compatible with all commonly used computer operating systems and protocols, including but not limited to those manufactured by Microsoft (Windows), Apple (Macintosh), Sun (Solaris), DEC, Compaq (Alpha), IBM (RS/6000), HP (HP9000) and SGI (IRIX). Additionally, local devices may communicate with remote computers via a variety of protocols including Universal Serial Bus ("USB"), American Standard Code for Information Interchange ("ASCII") and Recommend Standard-232 ("RS-232").

Figure 4:
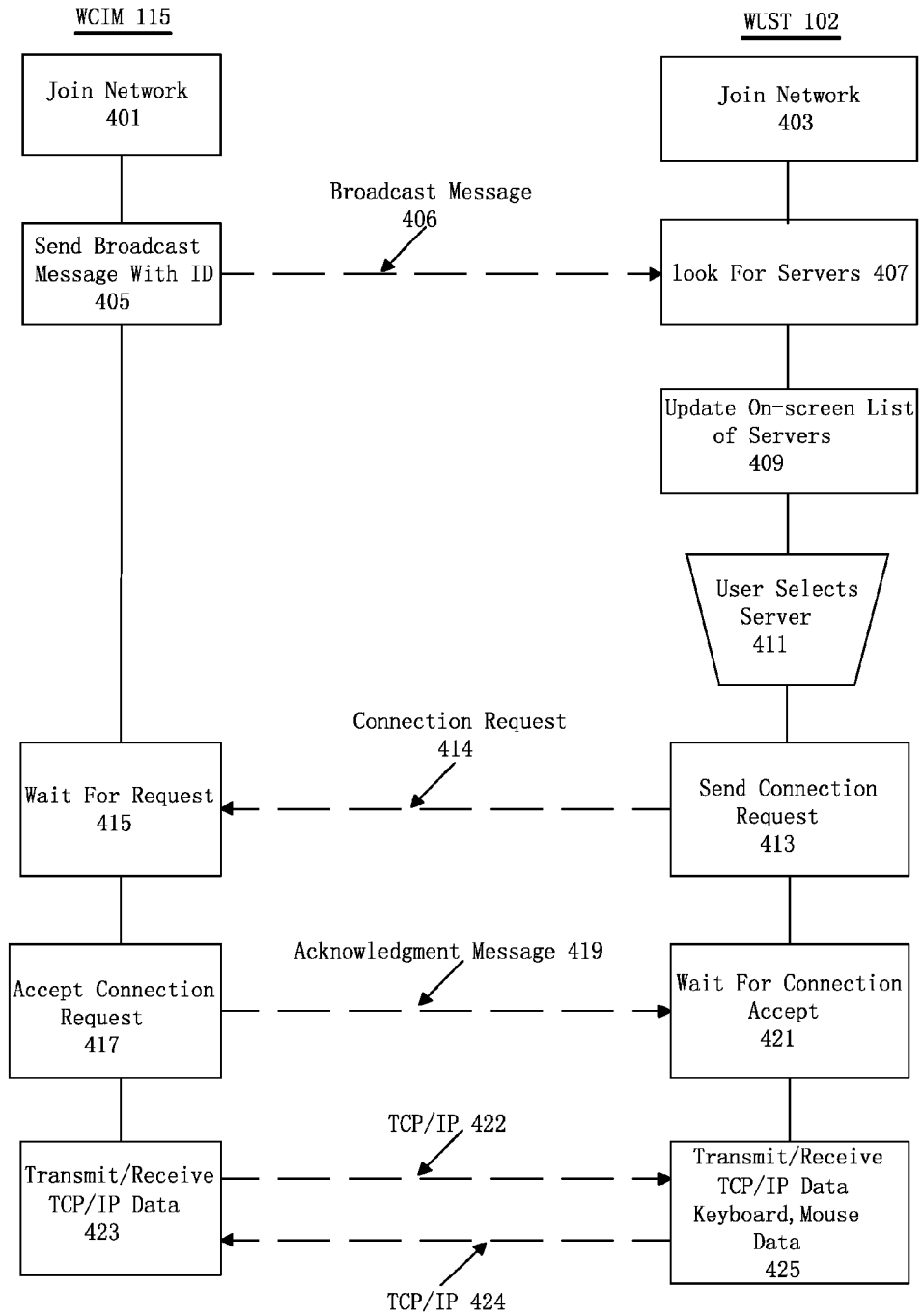
FIG. 4 is a flow chart that details the exchange of information between a WCIM and WUST to setup a connection between a user workstation and a remote computer.

Referring next to FIG. 4, depicted is a flow chart that details the exchange of information between a WCIM 115 and WUST 102 necessary to establish a connection between a user workstation 101 (including WUST 102, keyboard 103, monitor 105, and cursor control device 107) and a remote computer 117. The flow chart begins with WCIM 115 (coupled to remote computer 117) and WUST 102 (with associated keyboard 103, monitor 105 and cursor control device 107) also entering the same network (steps 401 and 403). Entering the network may simply entail coming within a range of communications, being powered-on, etc. As described above, the 802.11 standard supports ad-hoc dynamic networks where wireless devices can automatically enter a wireless network.

In step 405, WCIM 115 sends a broadcast message 406 that preferably includes identification information related to its associated remote computer 117. WCIM 115 may be configured to periodically send these broadcast messages to alert WUSTs 102 entering the network of the availability of the associated remote computer 117. Immediately after entering the network, WUST 102 enters a state in which it listens for these broadcast messages (step 407). Upon receipt of a broadcast message, WUST 102 updates the list of available servers displayed to the user on video monitor 105 (step 409).

In an alternative embodiment, WUSTs 102 send broadcast messages that request responses from WCIMs 115. Upon receipt of the broadcast message, WCIM 115 responds with identification information about its associated remote computer 117. WUST 102 updates the list of available servers utilizing the identification information.

WUST 102 displays a list of available remote computers 117 to the user, which is updated upon detection of any WCIM 115 entering or leaving the network (step 409). If the user selects a remote computer 117 from this list (step 411), WUST 102 sends a connection request 414 over the broadcast channel (step 413). WCIM 115, which is in a waiting state (step 415), can deny the request or accept the request (step 417). For example, if the associated remote computer 117 of WCIM 115 is under control of a different WUST 102, WCIM 115 denies the request. If WCIM 115 denies the request, a denial message is sent to WUST 102.

If WCIM 115 accepts the request, WCIM 115 sends an acknowledgment message to WUST 102 (acknowledgment message 419). Once WUST 102 sends connection request 414, it enters a waiting state (step 421) where it remains until it receives acknowledgment message 419. Preferably, connection request 414 includes a channel ID, selected by WUST 102, through which WUST 102 and WCIM 115 communicate upon acceptance and acknowledgement of request 414. As described earlier, an advantage of the 802.11 standard is that it allows for multiple channels of communication within the same network.

Upon acceptance of the connection, WCIM 115 sends acknowledgment message 419 on the requested channel. WUST 102 then begins to transmit TCP/IP data 224, which includes keyboard and cursor control device data from keyboard 103, and cursor control device 107 (step 423). WUST 102 sends this data over wireless communications path 121 to WCIM 115 through the selected channel. WCIM 115 receives the data and utilizes this data to generate signals for the keyboard port 305 and cursor control device port 307 of the remote server 117.

WCIM 115 begins to receive video data from its associated remote computer 117. WCIM 115 receives the video data, digitizes the data, and communicates the data, preferably as TCP/IP data 422, through wireless communications path 121 (step 421). This communication continues until the user of WUST 102 selects a different remote computer 117 to control.

To choose a different remote computer 117, a user at WUST 102 preferably depresses a designated "hot-key", such as the printscreen key or the F1 key on keyboard 103. This hot-key instructs WUST 102 to display an option menu of available remote computers 117 on monitor 105. The option menu includes a list of available remote computers 117, as determined by the receipt of the broadcast messages from associated WCIMs 115 (step 409). The option menu may also be a GUI which can include groups and descriptions of available servers, icons representing each server, etc. If the option menu is developed with software, it can have the look and feel of a standard environment (e.g., Windows, Macintosh, Java, etc). As described earlier, a user can select a remote computer 117 from the option menu which initiates transmission of a connection request (step 413) over the broadcast channel.

The computer management system of the present invention may include a number of other features. For example, various methods of restricting access to certain servers can be implemented. In one embodiment, to utilize the system of the present invention, a user first initiates a remote management session at WUST 102 and enters a required username and password. Of course any unique combination of authentication information may be utilized, including if preferred, biometric authentication. Again, the display capabilities of the option menu may be utilized to facilitate prompting the user for proper identification information.

WUST 102 and WCIM 115 also are compatible with, and preferably implement, encrypted or secure wireless transmission. Various standards for secure wireless transmission of data are known in the art. For example, the system of the present invention may utilize the wired equivalent privacy ("WEP") protocol, which adds security to WLANs based on the 802.11 Wi-Fi standard. WEP is an OSI data link layer security technology that can be turned "on" or "off." WEP is designed to give wireless networks the equivalent level of privacy protection as comparable wired networks. WEP is based on the RC4 security scheme that utilizes a combination of secret user keys and system-generated values. The original implementations of WEP supported 40-bit encryption; however, newer versions have 128-bit (or better) encryption. Of course, other methods of ensuring secure wireless transmission of data can be utilized such as the WiFi Protected Access (WPA) protocol, the Extensible Authentication Protocol (EAP), the Advanced Encryption Standard (AES), etc.

Figure 5:
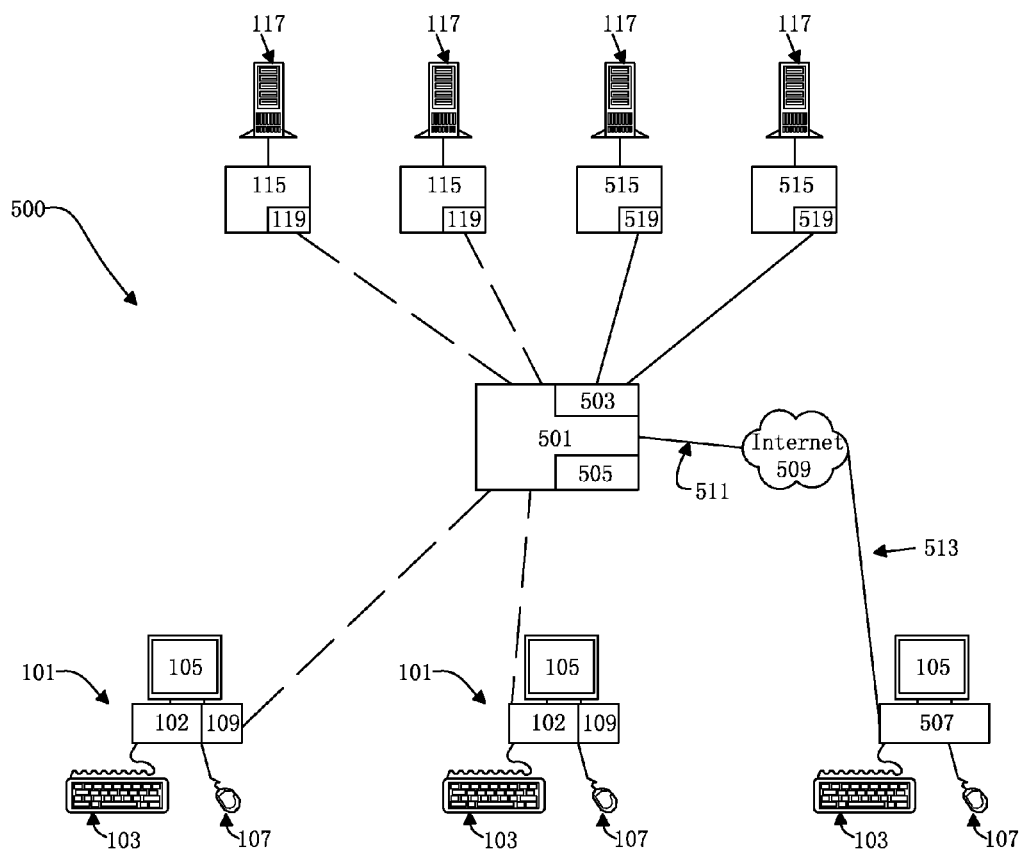
FIG. 5 is a schematic representation of the computer management system according to an alternate embodiment of the present invention illustrating the wireless connection of a user workstation that includes a keyboard, video monitor, and cursor control device to remote computers and servers through a wireless KVM access point.

Turning to FIG. 5, depicted is an alternate embodiment of the present invention in which a hybrid wireless/wired remote computer management system 500 is enabled with the utilization of access point technology. This embodiment of the present invention enables wireless WUSTs 102 to control remote computers 117 coupled to WCIMs 115 or wired computer interface modules (CIMs) 515. CIMs 515 are analogous to WCIMs 115, but they include wired communication devices (e.g., NICs 519) in lieu of wireless communication devices 119. Remote computer management system 500 also enables WCIMs 115 to be controlled by WUSTs 102 or by remote user stations (e.g., user workstation 507). Central to this embodiment is KVM wireless/wired switch 501 which includes traditional wired communications capability (NIC 503) and wireless communications ability (wireless device 119).

In this embodiment of the present invention, switch 501 can be a commercially available access point, which is used in lieu of an ad-hoc network. Advantageously, an access point can increase the scalability of the wireless network while still allowing devices to dynamically enter and leave the network. In an alternate embodiment of the system of the present invention, a central wireless switch with this access point technology is utilized to enable WCIMs and WUSTs to communicate.

Switch 501 also supports Internet connectivity. For example, NIC 503 can connect to Internet 509 through Internet connection 511, which may be a cable modem, DSL line, T1 line, etc. Advantageously, this connection allows remote access from any user workstation equipped with Internet connectivity. For example, user workstation 505, which is connected to Internet 509 through Internet connection 513, can access switch 501 and communicate with switch 501 utilizing TCP/IP. Thus, switch 501 enables user workstation 507 to communicate with any remote computer 117, regardless of the location or wireless capabilities of remote user workstation 507.

Figure 6:
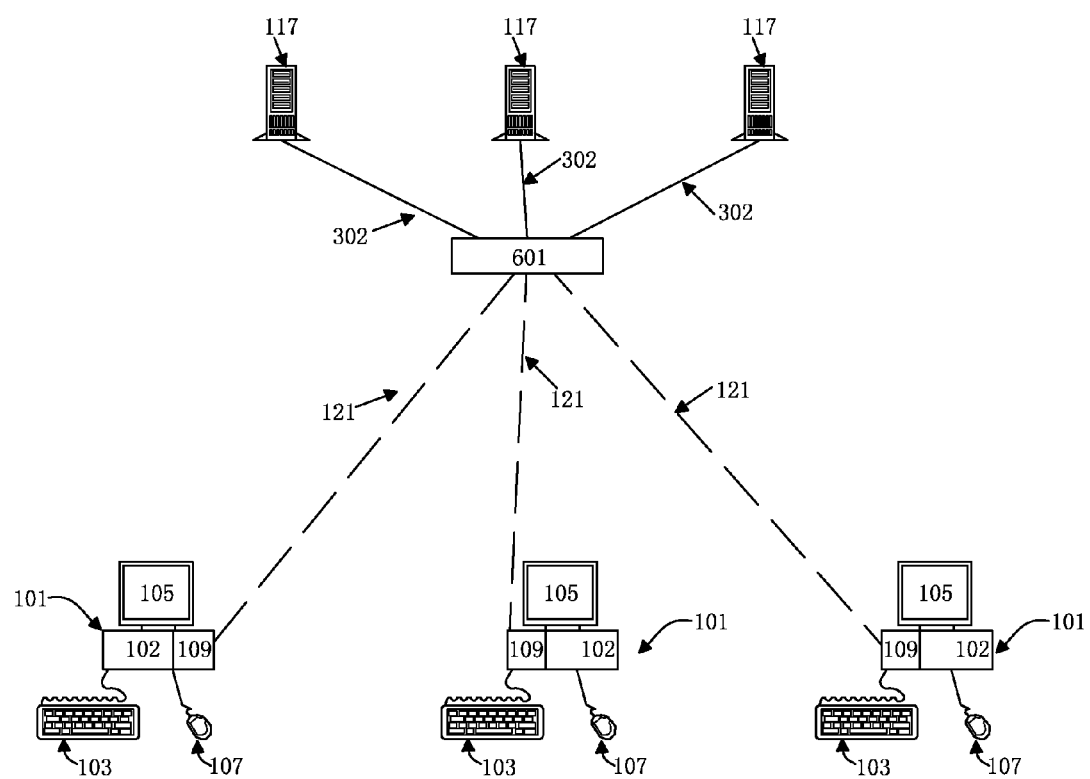
FIG. 6 is a schematic representation of the computer management system according to another alternate embodiment of the present invention illustrating the connection of multiple remote computers to one composite WCIM which communicates wirelessly to multiple WUSTs.

FIG. 6 is yet another embodiment of the present invention, in which multiple remote computers 117 are interfaced to one composite WCIM 601. Composite WCIM 601 is similar to WCIM 115, but with increased capabilities (e.g., additional KVM ports and additional wireless devices). Advantageously, composite WCIM 601 enables the present invention to connect multiple remote computers 117 with minimal hardware.

Figure 7:
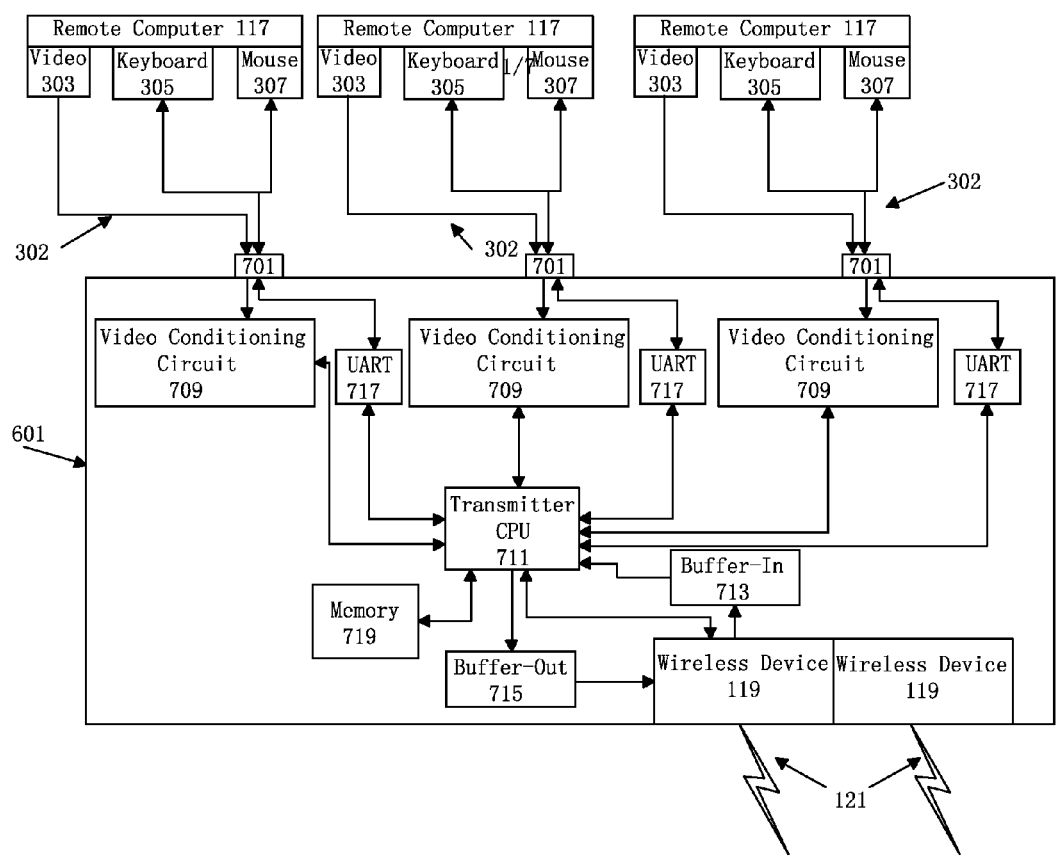
FIG. 7 is a schematic representation of the composite WCIM shown in FIG. 6 illustrating a block diagram of the internal structure of the composite WCIM and connectors for multiple keyboard ports, video monitor ports, and cursor control device ports.

Although the architecture of a composite WCIM 601 can vary, one example is shown in FIG. 7. Notably, composite WCIM 601 comprises similar components to WCIM 115 (FIG. 3), including WCIM CPU 711, buffer-in 713, buffer-out 715, and memory 719. To accommodate multiple remote computers 117 (three (3) are shown in FIG. 7, but more could be accommodated), composite WCIM 601 comprises multiple KVM ports 701, multiple UARTs 717 and multiple video conditioning circuits 709. WCIM CPU 711 must have the capability to receive input from multiple sources and memory 719 must be capable of storing identification information for each attached remote computer 117. Finally, composite WCIM 601 may have multiple wireless devices 119 to increase available bandwidth for communication to WUSTs 102 (FIG. 1).

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A system for providing wireless monitoring and control of remote devices, said system comprising:

a plurality of first transceivers each having a first wireless communications device and each said first transceiver being coupled to a user station comprising a keyboard, a video monitor and a cursor control device for receiving signals from said keyboard and said cursor control device; and a plurality of second transceivers each having a second wireless communications device and each said second transceiver being coupled to at least one of said remote devices for receiving video data from said remote devices and for transmitting said video data to a respective first transceiver over a wireless network, wherein each of said first and second wireless communication devices is configured to condition keyboard-video-mouse signals to operate in a peer-to-peer network, thereby enabling ones of said user stations to monitor and control ones of said remote devices directly without using a central switch to control connection between any one of said first transceivers and said second transceivers; and wherein each of said second transceivers is configured to receive a connection request message over a broadcast channel from one of said first transceivers coupled to a first one of the user stations, and to transmit a denial message when the at least one remote device coupled to said second transceiver is under the control of another one of the user stations.

2. A system according to claim 1, wherein said wireless network is an 802.11 wireless network.

3. A system according to claim 2, wherein said wireless network is an ad-hoc wireless network.

4. A system according to claim 2, wherein said wireless network is an infrastructure wireless network.

5. A system according to claim 1, wherein said wireless network is a Bluetooth network.

6. A system according to claim 1, wherein said wireless network includes a wireless enabled computer interface module.

7. A system according to claim 1, wherein each said first transceiver includes circuitry for displaying a list of said remote devices on said video monitor.

8. A system according to claim 7, wherein said one first transceiver is configured to transmit said connection request message to one of said plurality of second transceivers in response to a user's selection of a remote device coupled to said one second transceiver from said displayed list.

9. A system according to claim 8, wherein said connection request message includes a select channel for wireless communications between said first and second wireless communications devices over said wireless network.

10. A system according to claim 7, wherein said displayed list is generated by an on-screen display processor.

11. A system according to claim 7, wherein said displayed list is generated by software implemented on a general purpose processor.

12. A system according to claim 7, wherein said displayed list includes information related to said remote devices.

13. A system according to claim 12, wherein said displayed list is automatically updated when one or more additional remote devices join the peer-to-peer network.

14. A system according to claim 13, wherein each of said second transceivers is configure to compress said video data before transmitting said video data to said respective first transceiver.

15. A system according to claim 14, wherein each of said first and second transceivers is configured to encrypt said video data, keyboard data, and cursor control device data for transmission.

16. A wireless remote network management system for remotely monitoring and controlling devices comprising:

a plurality of first wireless-enabled transceivers each coupled to a keyboard, a video monitor and a cursor control device;

a plurality of second wireless-enabled transceivers each coupled to a remote device; and a central switch enabled for wireless communication and wired communication; wherein each said first wireless-enabled transceiver communicates keyboard and cursor control device signals from said keyboard and said cursor control device to said central switch via a first wireless network, wherein said central switch routes said signals via a second wireless network to one of said second wireless-enabled transceivers, wherein each said second wireless-enabled transceiver communicates video data via said second wireless network from said remote device to said central switch, and wherein said central switch communicates said video data to one of said plurality of first wireless-enabled transceivers via said first wireless network wherein said first and second wireless-enabled transceivers condition keyboard-video-mouse signals where appropriate to enable wireless transmission thereof, wherein each said first transceiver includes circuitry for displaying a menu of said remote devices on said video monitor, wherein said menu includes information related to said remote devices and said menu is automatically updated with additional remote devices without a monitoring workstation entering a different operational mode.

17. A system according to claim 16, wherein said first wireless network and said second wireless networks are 802.11 wireless networks.

18. A system according to claim 16, wherein each said first transceiver transmits a connection request message to the central switch and the central switch transmits the connection request message to one of said plurality of second transceivers in response to a selection from said menu.

19. A system according to claim 16, wherein said menu is generated by an on-screen display processor.

20. A system according to claim 16, wherein said menu is generated by software implemented on a general purpose processor.

21. A system according to claim 16, wherein said video data is compressed before being transmitted by said second transceiver.

* * * * *